April 24, 1934.   W. A. TRYON   1,955,841
SPRING SHACKLE
Filed June 27, 1929
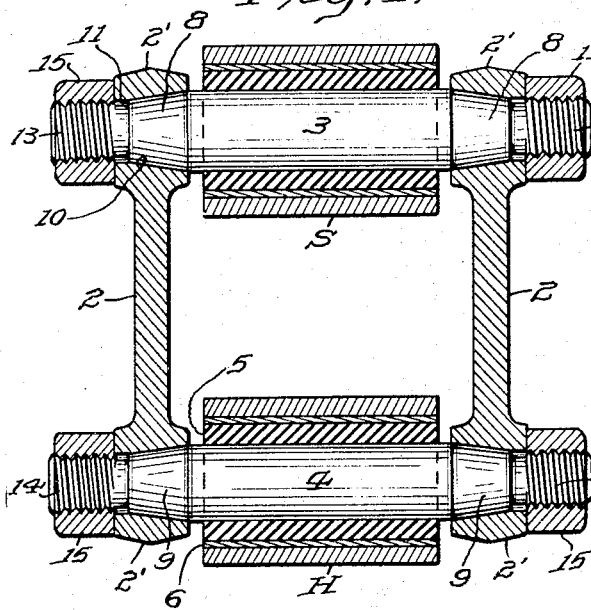
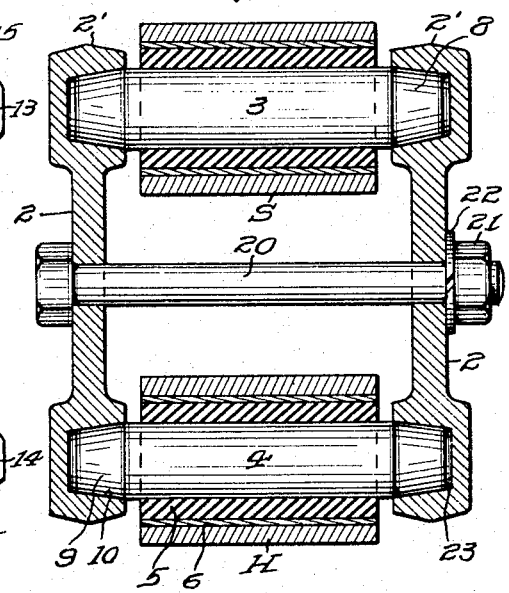
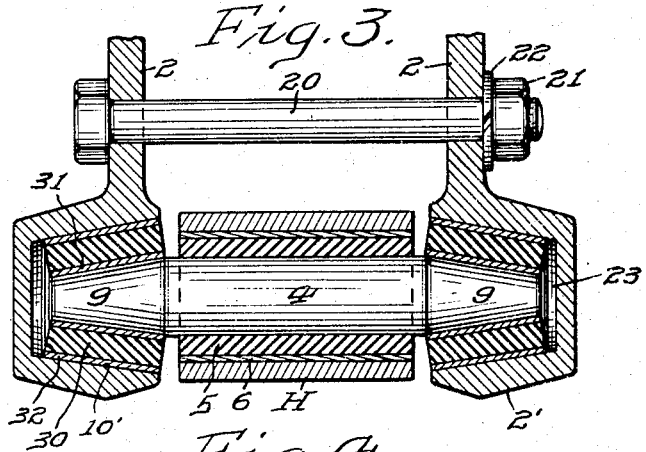
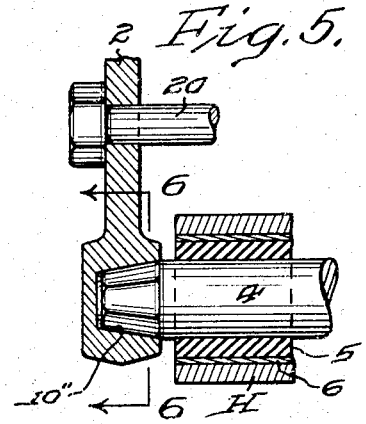
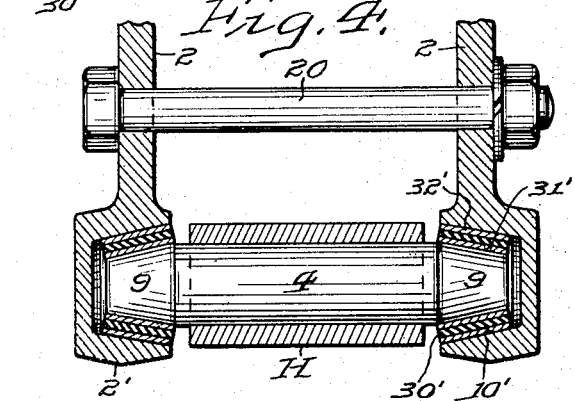
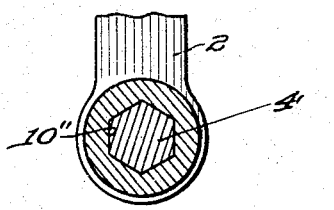
INVENTOR
William A. Tryon.
BY
ATTORNEYS Patented Apr. 24, 1934

1,955,841

UNITED STATES PATENT OFFICE 1,955,841

SPRING SHACKLE

William A. Tryon, Elmira, N. Y.

Application June 27, 1929, Serial No. 374,010

6 Claims. (Cl. 267—54)

The present invention relates to that class of spring shackles for automobiles and other vehicles in which the flexibility or capacity for relative movement between the parts of the shackle is secured through the employment of a material, such as rubber or the like, capable of yielding or moving upon itself instead of through the provision, as in the forms of shackles at present commonly employed in the automotive industry, of bearing surfaces or anti-friction bearings between the various parts of the shackle which are designed to move relatively to each other under operative conditions. Shackles employing such a yielding or resilient medium as aforesaid are advantageous in many respects, among which may be mentioned enhancement of the riding qualities of the vehicle, absolute freedom from wear since there are no relatively moving parts in engagement with each other, elimination of the necessity for lubrication, silence and long life.

It is imperative, however, that a spring shackle intended for factory equipment on present day automobiles must conform to certain requirements of the automotive manufacturers, among the more important of which are capability of rapid and economical production by automatic machinery, so far as possible, and with a minimum number of operations; capacity of substitution in places of the shackles ordinarily utilized without the necessity for material structural changes in the design or construction of the automobiles to which they are to be applied; capacity for assembly in the automobile in a minimum amount of time and with a minimum expenditure of labor and, finally, capacity for satisfactory and trouble-free use in the hands of the purchaser of the automobile.

It is therefore an object of the present invention to provide a shackle adapted to satisfactorily meet these requirements of the automotive manufacturers as well as those of the purchaser and user of the automobiles on which the shackles are installed and therefore, with a view to enabling those skilled in the art to comprehend and practice the invention, I have shown in the accompanying drawing and shall now proceed to describe certain forms of shackles constructed in accordance therewith, it being, however, understood that such illustration and description are intended as illustrative only and in no way in a limiting or restrictive sense as, if desired, the principles of my invention may be readily embodied in shackles of forms other than those to which I shall more particularly refer without departing from the spirit and scope of the invention as hereinafter defined by the appended claims.

In the said drawing, Fig. 1 is a central vertical section through one form of my improved shackle with certain parts shown in elevation and Fig. 2 is a similar view of another form thereof. Figs. 3 and 4 are respectively central vertical sections as in the case of Figs. 1 and 2, showing still other forms of shackles constructed in accordance with my invention, only one end of each shackle, however, being illustrated in these figures. Fig. 5 is a fragmentary view illustrating a further modification more particularly applicable to shackles of the form shown in Figs. 1 and 2, although in certain cases capable of use in shackles of the forms shown in the other preceding figures, and Fig. 6 is a fragmentary section on line 6—6 of Fig. 5 looking in the direction of the arrows. The same symbols are used to designate like parts in the several figures.

Referring now more particularly to the form of shackle shown in Fig. 1, the same comprises oppositely disposed, laterally spaced side links 2, 2 having, preferably, enlarged, bosses 2' at their ends, operatively united by transversely extending pins 3, 4 which may be either solid or tubular as desired. Surrounding the central portion of each of these pins and firmly united thereto in any suitable way so as to be incapable of revolution thereabout under any normal operative condition to which the shackle may be subjected, is a cylindrical bushing 5 of rubber or other material having generally similar characteristics and which is capable of yielding or flowing on itself, if it may be so expressed, when the shackle is in operation. This bushing is of relatively considerable thickness and is in turn surrounded by a preferably thinner bushing or sleeve 6 of steel or other suitable metal, the inner face of which is likewise firmly united to the yieldable bushing 5 in any suitable way, so that when assembled each pin, yieldable bushing and sleeve 6 form a single operative unit.

The sleeves 6 are respectively of suitable exterior diameter for disposition in the two relatively movable parts which are to be operatively connected by the shackle, for example, the usual cylindrical eye of the vehicle spring S and the usual hanger H attached to the frame of the automobile, and are respectively pressed into the spring eye and hanger or otherwise secured therein so as to be incapable of relative movement with respect thereto. Thus, when the several parts to which reference has just been made are assembled, the pin 3 is capable of being rotated to a certain extent about its axis with respect to the spring S through the yieldability or flexibility of the bushing 5 and, in like manner, the pin 4 is capable of similar limited axial rotation with respect to the hanger H in which it is disposed. It will, of course, be understood that while I have referred more particularly to the disposition of the upper pin 3 in the eye of the spring S and of the lower pin 4 in the hanger H whereby the spring is disposed above the hanger, in practice the spring is frequently disposed below the hanger instead, in which case, of course, the pin 3 will extend through the hanger and the pin 4 through the spring eye.

Now, in order that this capacity of limited relative rotative movement between the pins 3 and 4 and the parts of the vehicle, for example, the spring and the hanger in which they are respectively assembled, may be suitably utilized in the performance of the functions of the shackle as a whole, it is necessary that the pins be very firmly secured in the side links 2 so that the pins are incapable of axial rotation or other movement relative to the links under any operative condition to which the shackle may be subjected and, in the form of the invention shown in Fig. 1, this rigid interconnection between the pins and the side links is effected in the following way, namely, by providing the ends of the pins which project outwardly in either direction from the central portions thereof where the bushings 5 are seated with tapering or conical surfaces 8 and 9 and the bosses 2' at the ends of the links with correspondingly tapered or conical pockets 10 for the reception thereof. Beyond their tapered surfaces or areas, the pins are externally threaded and extended oppositely outward through cylindrical bores 11 extending through the bosses beyond their tapered pockets 10 whereby the threaded ends 13, 14 of the pins project outwardly beyond the bosses of the side links to receive the nuts 15, which, when drawn up against the outer faces of the bosses, force the side links inwardly on the tapered portions of the pins so as to seat them very firmly thereon and eliminate the possibility of the pins turning in the side links after the shackle is assembled.

It will thus be apparent that when the shackle is assembled in the automobile and the nuts 15 tightly set up, the pins 3, 4 and side links 2 form a rigid unit the several parts of which are incapable of relative movement with respect to each other but that, on the other hand, capacity for the play between the spring and the hanger requisite for the proper functioning of the springs of the automobile is provided through the yielding or resilient bushings 5 which permit relative limited rotational movement of the sleeves 6 about the pins 3, 4 with consequent proper and satisfactory functioning of the shackle as a whole.

To effect this result, however, the resistance of the pins to turning movement in the side links must at all times exceed the turning torque transmitted to the pins by the resilient bushings 5, as otherwise the pins would turn in the side links and quickly wear loose in the latter so that instead of the relative movement between the sleeves 6 and the pins being absorbed or taken up in the yieldable bushings 5 as in the normal operation of the shackle, the sleeves and the pins would remain relatively stationary and the entire turning movement would take place between the side links and the ends of the pins. In order to insure maximum rigidity in the connection between the pins and the side links, it is therefore desirable to make the coned portions of the pins and correspondingly tapered pockets in the links of relatively slight taper or angularity; thus, for example, a taper of approximately 2½° to the axis of the pin affords good results in practice, while to permit the links to be forced on the pins to the maximum extent necessary to insure the requisite intimate contact between the engaging coned surfaces of the links and pins, the ends of the pins beyond their coned portions are preferably slightly reduced in diameter as shown while the bores 11 are made of at least as great a diameter as the outer extremities of said portions so that, if need be, the latter may slightly enter the bores.

It will of course be apparent that if at any time any looseness or play should develop between the pins and the side links, it is only necessary to set up the nuts 15 to eliminate the same and thus return the shackle to a properly operative condition.

In the form of shackle shown in Fig. 2 the bosses 2' at the ends of the side links are provided with pockets 10 in the manner already described, and the pins 3 and 4 with tapered or coned ends for engagement therein. Instead, however, of the ends of the pins being threaded beyond the conical portions and extended entirely through the side links for the reception of nuts as in the form of the invention shown in Fig. 1, the pins are terminated at the extremities of their conical portions and the corresponding cylindrical bores 11 in the bosses are omitted, while for securing the side links in assembled position on the pins a bolt 20 is extended transversely through the links approximately midway between their ends to receive a nut 21 beyond the outer face of one of the links, the head of the bolt resting against the outer face of the opposite link; a lock washer 22 may be seated beneath the nut in the usual way so as to prevent the same from backing off. It will thus be apparent that when the parts are assembled and the nut drawn up, the links will be forced very tightly on the tapered ends of the pins which are thus restrained from turning in the links in the manner already described. It will also be noted that the pockets in the links are desirably of slightly greater depth than the length of the conical portions of the pins so as to leave a clearance 23 between the ends of the pins and bottoms of the pockets to prevent the pins from bottoming in the latter before the nut on the bolt is drawn up as tightly as possible; in the absence of this clearance the pins might conceivably bottom in the pockets before the desired intimate contact between the conical portions of the pins and the pocket walls is effected.

The form of shackle shown in Fig. 2 is ordinarily somewhat less expensive to manufacture than that shown in Fig. 1 and will thus frequently be preferred to the latter and, under most conditions of installation and operation is equally as satisfactory. However, since in the form of shackle shown in Fig. 1, the nuts 15 are respectively disposed adjacent the ends of the links in alignment with the tapered surfaces which are to be drawn into contact, the power exerted through the nuts to force the side links upon the pins is delivered in the most effective way to bring about the desired result, while, additionally, any slight disalignment of or elasticity or spring in the side links which might tend to interfere with or prevent the desired intimate contact between the tapered surfaces when the links are drawn together by power applied at a point or points not in direct alignment with the pins, as for example at the centers of the links as in Fig. 2, has no substantial inimical effect in opposition to the enormous power which can be directly exerted through the nuts 15. Therefore, for use upon the heavier types of automobiles or those in which the slight additional manufacturing cost usually entailed by the form of shackle shown in Fig. 1 is not of serious moment, that type of shackle is ordinarily to be preferred to the form shown in Fig. 2 which latter, however, under most conditions, and particularly for the lighter and less expensive types of automobiles, is entirely satisfactory.

In the form of the invention shown in Fig. 3, in which only one end of the shackle is shown, the opposite end being desirably similar thereto, the pockets 10′ in the side links are made of greater diameter to enable them to receive a compound conical bushing formed by a conical annulus 30 of yieldable material, similar to the bushings 5, disposed between and permanently united to inner and outer conical metal sleeves 31 and 32, the inner surface of the former being adapted to engage the conical surface 9 of the pin 4 and the outer surface of the latter being adapted to engage the inner surface of the pocket in the adjacent link. Thus, when the nuts 10 are drawn up as heretofore described, the outer sleeve 32 is brought into intimate and non-rotatable contact with the wall of the pocket in which it is disposed and the inner surface of the sleeve 31 is brought into similar contact with the adjacent coned surface of the pin, in consequence of which limited relative rotational movement of the links about the pins can take place when the shackle is in operation. This form of shackle is also provided with the yieldable bushings 5 on the central portions of the pins as hereinbefore described, the sleeves 6 surrounding said bushings being respectively rigidly assembled in the hanger H or spring eye S as in the case of the form of shackle shown in Figs. 1 and 2.

In order to equally distribute the total turning torque between each pair of the bushings 30 and bushing 5 disposed between them, it is necessary to so distribute the total volume or quantity of the yielding material throughout the three bushings that the resistance to said torque afforded by the central bushing 5 will approximately equal that afforded by the two conical or end bushings 30 combined. This desirable distribution of the material is indicated in Fig. 3 in which it will be noted that the combined length of the bushings 30 substantially equals the length of the central bushing 5 while the bushings 30 are of slightly greater thickness than the central bushing to compensate for the reduction in their cubic content or volume resulting from their conical form. Another way of effecting this desirable equal distribution of the yielding material between the central bushing and the end bushings 30 is to slightly increase the relative length of the coned portions of the pin and end bushings with respect to the length of the central bushing 5, in which case the thickness of the end and central bushings may be equal, the increased length of the former effecting the desired compensation by permitting distribution in each end bushing of an amount of material substantially equal to one-half of that in the central bushing.

As in the case of the form of shackle shown in Fig 2, a clearance 23 is desirably provided between the bottom of each pocket 10′ and the adjacent end of the pin and its surrounding bushing and sleeves so as to prevent the bottoming of the latter in the pocket before the desired intimate contact between the walls of the pocket and the sleeve 32 is secured by setting up on the nut 21.

The form of shackle to which reference has just been made is very flexible owing to the relatively large amount of yielding material which it embodies and will be found desirable for certain classes of vehicles and under certain conditions of operation, though ordinarily somewhat more expensive to manufacture than the forms shown in the preceding figures.

In the form of shackle shown in Fig. 4 the central yielding bushing 5 with its surrounding sleeve 6 is omitted and the pin pressed or otherwise directly and non-rotatably seated in the hanger H or spring eye S as the case may be. As in the forms of the invention shown in Fig. 3, the side links 2 are provided with bosses 2′ having pockets 10′ for the reception of a compound bushing of conical form composed of a conical annulus 30′ disposed between inner and outer conical sleeves 31′, 32′, this compound bushing surrounding each coned end 9 of the pin with the inner sleeve 31′ in non-rotatable engagement therewith and the outer sleeve 32′ in similar non-rotatable engagement with the wall of the pocket when the shackle is assembled as shown and the nut 21 drawn up tightly to effect the requisite intimate engagement between the outer sleeve and the side links. In this form of shackle the requisite relative rotation between the pin and side links is absorbed in the resilient bushings 30′ entirely and not distributed between said bushings and a central bushing as in the case of the form of the invention shown in Fig. 3.

I have hereinbefore referred more particularly to the use of pins comprising conical ends since these will ordinarily be found entirely satisfactory and can be manufactured at a low cost. However, under certain conditions it may be preferred to employ, more particularly in the forms of the invention shown in Figs. 1 and 2, pins having polygonal ends as illustrated in Figs. 5 and 6 in which a pin 4 having an outwardly tapering hexagonal end is shown together with a side link having a pocket 10″ whose inner wall or periphery is of hexagonal cross section and corresponding taper so as to properly receive the end of the pin. While a pin having polygonal ends in association with side links having correspondingly formed pockets does not require, to prevent relative rotation between the pin and the side links, the same degree of intimate engagement between its outer surface and the inner surface of the pocket as is required where said surfaces are respectively conical, nevertheless a material degree of intimate engagement between these parts is desirable in that it prevents lost motion with consequent rattling and wear.

Moreover, the use of the conical ended pins as distinguished from the polygonal ones is further desirable in that it facilitates proper assembly of the shackle in the automobile under the usual methods of assembly as now practised in the automotive industry and in accordance with which the car frame is ordinarily connected with the axles through the medium of the springs and the spring shackles prior to the seating of the body on the frame and, in some cases, even prior to the assembly of the motor and transmission upon it. Thus, when the shackles are first installed, the springs are subjected merely to the weight of the frame or, perhaps, of the frame and motor so that they are under a state of relatively light compression and consequently hold the frame much higher with respect to the axles than they do when the weight of the body and motor is thereafter imposed thereon. When using an ordinary form of shackle this is not inimical to rapid and satisfactory assembly, for when the additional weight of the body and other parts is applied to the frame the shackles merely adjust themselves automatically to the new condition and thereby assume the position they are designed to normally occupy in the car after final assembly. However, if a shackle of the type of that to which my invention relates is interposed between the spring and the frame and the pins of the shackle rigidly secured to the side links when the frame is not supporting its normal load, the subsequent imposition of that load on the frame results in placing the yieldable bushings of the shackle under tension or strain when the shackle is forced by the consequent downward movement of the frame to its normal operative position, whereas for satisfactory operation, the said bushings when the shackle is in such position should be substantially free from any permanent torque or twist so they can yield with equal freedom in either direction of rotation in the operation of the car. Therefore, when a shackle constructed in accordance with the principles of my invention and embodying pins having conical ends is employed, it is only necessary in order to obtain the proper final adjustment of the shackle in which, as stated, the yieldable bushings should be in a substantially untwisted or neutral condition, to refrain from fully tightening the side links on the pins during initial assembly of the shackle between the springs and the frame when the latter is raised whereby the shackles can assume their normal position by rotation of the pins in the side links after the full load is imposed on the frame; the nuts 15 or 21 can then be finally set up to prevent further rotation of the pins in the links. Obviously this automatic, if it may be so termed, adjustment of the shackles to their proper position during assembly of the car cannot be so readily effected where the ends of the pins are of polygonal cross section, especially if the ends of each pin only present a relatively small number of faces since under these conditions it is difficult, and in some cases almost impossible, for the pins to turn in the links to their normal position as the frame settles under its normal load even though the links are only loosely assembled on the pins.

While I have herein described and illustrated certain forms of shackles embodying the principles of my invention with considerable particularity, I do not thereby desire or intend to confine myself solely thereto as the invention may be employed with equal facility in shackles of forms other than those to which I have chosen to refer and changes and modifications may be made in the design and construction of the various parts if desired without departing from the spirit and scope of the invention as defined in the appended claims.

Having thus described by invention, I claim and desire to protect by Letters Patent of the United States:

1. A spring shackle comprising side links, pins respectively extending between said links and having tapered ends adapted for reception therein, a yieldable bushing surrounding each pin, non-rotatable with respect thereto and adapted for non-rotational engagement with a chassis part or a spring part of the vehicle, and means for drawing said side links oppositely inward on the tapered ends of the pins to effect non-rotational engagement between the pins and the links while maintaining the bushings in rotational equilibrium relatively to their respectively adjacent spring and chassis parts.

2. A spring shackle comprising a pair of pins provided with tapered ends, a pair of side links having pockets for the reception of the tapered ends of the pins, a bushing of yieldable material mounted on each pin, restrained from rotation thereon and adapted for non-rotational engagement with the chassis or the spring of the vehicle and means for drawing the side links oppositely inward on the tapered ends of the pins to effect intimate non-rotational engagement between said ends and the links while maintaining the bushings in rotational equilibrium relatively to their respectively adjacent spring and chassis parts.

3. A spring shackle comprising a pair of yieldable bushings respectively adapted to be received in the spring and chassis of a vehicle, a pin extended through each bushing, relatively non-rotatable with respect thereto and provided with outwardly tapered ends, side links having tapered pockets for the reception of the ends of said pins, and means for simultaneously drawing the links oppositely inward on the ends of the pins to thereby bring the tapered surfaces of the links and of the pins into intimate non-rotational engagement while maintaining the bushings in rotational equilibrium relatively to their respectively adjacent spring and chassis parts.

4. In a method of assembling a vehicle spring connection comprising side links and metallic pins adapted for reception in the side links and respectively surrounded by yieldable bushings, the steps of inserting said pins respectively in a spring eye and an adjacent vehicle chassis part to be connected therewith, securing the side links to the adjacent ends of the pins in rotatable relation, thereafter imposing a load on said chassis to thereby extend the spring and effect rotation of said pins with respect to said links, and finally effecting nonrotatable engagement between said pins and links to thereby maintain the bushings in rotative equilibrium in supporting the normal load imposed thereon by the vehicle.

5. In motor vehicle assembling, the steps of inserting metallic pins each surrounded by a yieldable bushing respectively in an eye of each vehicle spring and in their adjacent chassis parts, securing side links to adjacent ends of said pins in rotatable engagement therewith, thereafter substantially completing the assembly of the vehicle to thereby impose a normal load on said springs and effect relative rotation between the pins and the links, and finally effecting nonrotatable engagement of said pins with their adjacent links to thereby maintain said bushings in rotative equilibrium under the normal load of the vehicle at rest.

6. A vehicle spring connection having a load imposed thereon, comprising a metallic pin extending through a substantially cylindrical chassis part and having conically tapered ends, side links having conically tapered pockets respectively receiving said ends, means operative to maintain said links and pins in non-rotative relation, and a yieldable bushing frictionally engaging said pin and said chassis part respectively and arranged in rotative equilibrium therebetween to support the normal load imposed by the vehicle.

WILLIAM A. TRYON.